United States Patent

Foster

[15] 3,696,273

[45] Oct. 3, 1972

[54] BILATERAL, GATE-CONTROLLED SEMICONDUCTOR DEVICES

[72] Inventor: Alan Foster, Stockport, England

[73] Assignee: U. S. Philips Corporation, New York, N.Y.

[22] Filed: March 31, 1970

[21] Appl. No.: 24,233

[30] Foreign Application Priority Data

Feb. 27, 1970 Great Britain............9,723/70

[52] U.S. Cl..........................317/235 R, 317/235 AB

[51] Int. Cl................................................H01l 11/10

[58] Field of Search......................................217/235

[56] References Cited

UNITED STATES PATENTS

| | | | |
|---|---|---|---|
| 3,360,696 | 12/1967 | Neilson et al. | 317/235 |
| 3,391,310 | 7/1968 | Gentry | 317/235 |
| 3,476,992 | 11/1969 | Chu | 317/235 |
| 3,443,171 | 5/1969 | Knott et al. | 317/235 |
| 3,504,241 | 3/1970 | Dumanevich et al. | 317/235 |

*Primary Examiner*—Jerry D. Craig

*Attorney*—Frank R. Trifari

[57] ABSTRACT

A bilateral, gate-controlled thyristor having five layers has end zones, with respect to the main current flow direction, have adjacent peripheries proximate to the gate electrode in an overlapping relationship while having adjacent peripheries distal to the gate electrode in a spaced relationship. Improved commutation is obtained without any loss of operational modes with this structure.

7 Claims, 20 Drawing Figures

Figure 1:
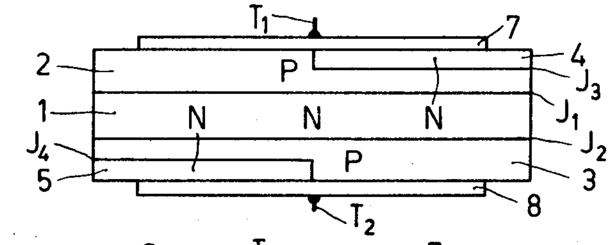
Fig.1 PRIOR ART

ALAN FOSTER INVENTOR.

BY

AGENT.

ALAN FOSTER

INVENTOR.

BY

AGENT.

ALAN FOSTER
INVENTOR.
BY [signature]
AGENT.

ALAN FOSTER
INVENTOR.

BY [signature]
AGENT

ALAN FOSTER

INVENTOR.

BY

AGENT.

ALAN FOSTER
INVENTOR.

BY [signature]
AGENT.

BILATERAL, GATE-CONTROLLED SEMICONDUCTOR DEVICES

This invention relates to bilateral, gate-controlled semiconductor devices.

Semiconductor devices comprising a semiconductor having four successively arranged regions of alternating conductivity type defining three p-n junctions therebetween and electrodes on the outer two regions are known. Such two-terminal devices may be referred to as diode thyristors. A further development of such devices is the gate controlled thyristor or silicon controlled rectifier in which a third, gate electrode is present on one of the two intermediate regions. In the operation of these devices a relatively small voltage applied at the gate electrode can switch the device from a high impedance, non-conductive state to a low impedance, conductive state when a suitable forward voltage is applied between the electrodes on the outer two regions. A small current applied to the gate electrode initiates the flow of a much greater current through the device between the main current carrying electrode on the outer two regions. These devices are unilateral in that with alternating current applied across the main current carrying electrodes the device can exist in the low impedance, conductive state only in one half cycle of the applied alternating current. In order to provide full-wave power control two or more thyristors have to be used or the alternating source must be rectified to provide a pulsating unidirectional wave.

Semiconductor devices suitable for full wave power control of an alternating current are known and comprise a semiconductor body having five successively arranged regions of alternating conductivity type having three p-n junctions therebetween. The body has an inner zone of one conductivity type between first and second outer zones of the opposite conductivity type extending at first and second opposite sides of the body and forming p-n junctions with the inner zone, the first and second outer zones respectively being in ohmic contact with first and second main current carrying electrodes at said first and second opposite sides of the body. First and second further zones of the one conductivity type form p-n junctions with the first and second outer zones respectively and extend at said first and second opposite sides of the body respectively in ohmic contact with the first and second main current carrying electrodes. These devices are bilateral and can exist in a conductive state in both directions of an alternating supply connected across the main current carrying electrodes. There exist various forms of these devices which differ in respect of the gate control means present for rendering the device conductive.

Some prior art bilateral semiconductor switching devices and some of the problems arising in their operation will now be described with reference to FIGS. 1 to 6 of the accompanying diagrammatic drawings which show cross-sections of the semiconductor bodies of six different prior art bilateral semiconductor switching devices of which the devices shown FIGS. 2 to 5 all consist of gate controlled devices.

Referring first to FIG. 1, this device comprises a semiconductor body having an inner n-type zone 1 situated between first and second outer p-type zones 2 and 3 extending at first and second opposite sides of the body and forming p-n junctions $J_1$ and $J_2$ respectively with the inner n-type zone 1. A first further n-type zone 4 forms a p-n junction $J_3$ with the first outer p-type zone 2 and extends at the same, one side of the body as said zone 2. A second further n-type zone 5 forms a p-n junction $J_4$ with the second outer p-type zone 3 and extends at the same, opposite side of the body as said zone 3. At the said one side there is a first main current carrying electrode 7 in ohmic contact with the p-type zone 2 and the n-type zone 4 and shorting part of the junction $J_3$. Electrode 7 is connected to main current carrying terminal $T_1$ of the device. At the opposite side there is a second main current carrying electrode 8 in ohmic contact with the p-type zone 3 and the n-type zone 5 and shorting part of the junction $J_4$. Electrode 8 is connected to main current carrying terminal $T_2$ of the device. Operation of this device may be considered separately in the two half cycles of an alternating supply connected across terminals $T_1$ and $T_2$, one with the supply voltage such that terminal $T_1$ is positive and terminal $T_2$ is negative, and the other with the supply voltage such that terminal $T_1$ is negative and terminal $T_2$ is positive. The outer p-type zones 2 and 3 perform different functions for conduction through the device in the two half cycles. In the first half cycle junctions $J_1$ and $J_4$ are forward biased and junctions $J_2$ and $J_3$ are reverse biased. The p-type zone 2 constitutes an emitter and the junction $J_1$ is considered as an emitter junction. Under these conditions the p-type zone 3 constitutes a base zone and the n-type zone 5 constitutes an emitter and the junction $J_4$ is considered as an emitter junction. In this half cycle electrons are injected across junction $J_4$ into the p-type zone 3 and move towards the junction $J_2$. Holes injected across junction $J_1$ into the n-type zone 1 move towards the junction $J_2$. However junction $J_2$ is reversed biased and tends to block the flow of current through the device. The device does not become conductive in this half cycle until the voltage between the terminals $T_1$ and $T_2$ forces conduction across the junction $J_2$, this voltage being referred to as the breakover voltage. In the second half cycle junctions $J_2$ and $J_3$ are forward biased and junctions $J_1$ and $J_4$ are reverse biased. The p-type zone 3 constitutes an emitter and the junction $J_2$ is considered as an emitter junction. Under these conditions, the p-type zone 2 constitutes a base zone and the n-type zone 4 constitutes an emitter, the junction $J_3$ being considered as an emitter junction. In this half cycle electrons injected across junction $J_3$ into the p-type zone 2 move towards the junction $J_1$ and holes injected across junction $J_2$ into the n-type zone 1 move towards the junction $J_1$. However junction $J_1$ is reverse biased and tends to block the flow of current through the device. The device does not become conductive in this half cycle until the voltage between the terminals $T_1$ and $T_2$ forces conduction across the junction $J_1$, this voltage being referred to as breakover voltage.

Thus it is seen that in one half cycle n-type zone 5 constitutes an emitter and in the other half cycle n-type zone 4 constitutes an emitter. These zones will be referred to hereinafter as the outer n-type emitter zones on opposite sides of the body. In the first half cycle after exceeding the breakover voltage of junction $J_2$, the conduction between the electrodes 7 and 8 is via the p-n-p-n thyristor structure on the left hand side of the device constituted by the successively arranged zones 2, 1, 3, 5 and in the other half cycle after exceeding the breakover voltage of junction $J_1$ the conduction between the electrodes 7 and 8 via the n-p-n-p thyristor structure on the right hand side of the device constituted by the successively arranged zones 4, 2, 1, 3. Thus, the conduction of the device during the first and second half cycles is confined respectively to the left hand side and right hand side of the device, it being noted that the junctions $J_3$ and $J_4$ are shown intersecting opposite surfaces of the body in substantially the same plane. This device is a relatively simple form of a bilateral switching device and although it can have symmetrical characteristics since the breakover voltages of junctions $J_1$ and $J_2$ can be made substantially the same, it has the major disadvantage that there is no provision for controlling the initiation of conduction during the two half cycles.

Figure 2:
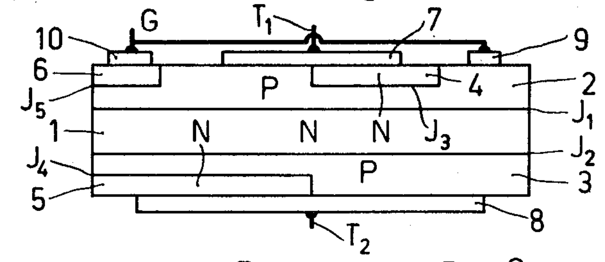
Fig.2 PRIOR ART

FIG. 2 shows a device similar to the device shown in FIG. 1, corresponding zones, junctions and terminals being indicated with the same reference numerals, but differing in operation in that the initiation of conduction can be controlled. In this device the zone 4 is made smaller in order to accommodate a gate electrode 9 on the surface of the p-type zone 2. Furthermore an n-type gate zone 6 forming a p-n junction $J_5$ with the p-type zone 2 is provided at the one side and is contacted by a further gate electrode 10, the electrodes 9 and 10 being connected to a common gate terminal G. In operation of this device when terminal $T_1$ is positive and terminal $T_2$ is negative, conduction may be initiated between the electrodes 7 and 8 through the p-n-p-n thyristor structure constituted by the zones 2, 1, 3, 5, by applying to the electrode 10, via gate terminal G, a voltage which is negative with respect to the voltage on the electrode 7, thus causing a change of the conduction across junction $J_2$. This occurs as follows:
When the electrode 10 is biased negative with respect to the electrode 7 the n-type gate zone 6 acts as an emitter and electrons are emitted across junction $J_5$ into the p-type zone 2. The electrons diffuse into the p-type zone 2. The electrons diffuse towards the junction $J_1$ where they are collected and thus lower the potential of the n-type zone 1 relative to the p-type zone 2 thus causing the p-type zone 2 to inject holes into the n-type zone 1. Thus, as occurs in conventional thyristor operation, a change of the reverse bias across the blocking junction $J_2$ occurs and eventually this junction becomes forward biased and conduction occurs. In operation of the device when terminal $T_1$ is negative and terminal $T_2$ is positive, conduction may be initiated between electrodes 7 and 8 through the n-p-n-p thyristor structure constituted by the zones 4, 2, 1, 3 by biasing the electrode 9, via gate terminal G, with a voltage which is positive with respect to the voltage applied to the gate electrode 7. This causes the n-type zone 4 to inject electrons into the p-type zone 2. The injected electrons, which are not injected uniformly across junction $J_3$ due to the lateral voltage drop along the junction $J_3$ in the p-type zone 2, diffuse towards junction $J_1$ and lower the potential of the n-type zone 1 relative to the p-type zone 3 in the region opposite the electron injection. Holes are injected from the p-type zone 3 into the n-type zone 1 and diffuse towards junction $J_1$. The holes collected at $J_1$ raise the potential of p-type zone 2 relative to the n-type zone 1 thus causing further injection of electrons from n-type zone 4 into the p-type zone 2. The build up of holes in the p-type zone 2 causes the voltage across $J_3$ to increase and lateral flow of hole current causes more of the p-type zone to be positive which causes increased injection of electrons across $J_3$. The increase of charge in both zones 1 and 2 causes the depletion layer of junction $J_1$ to collapse and conduction through the device occurs. This device can be rendered conductive in the first quadrant ($T_1$ negative and $T_2$ positive) by applying a voltage to gate terminal G which is positive with respect to $T_1$ and in the third quadrant ($T_1$ positive and $T_2$ negative) by applying a voltage to gate terminal G which is negative with respect to $T_1$.

In the device shown in FIG. 2 the n-type outer emitter zones 4 and 5 do not overlap. However in providing this form of the device the gate electrode structure is unnecessarily complicated. It would of course be possible to provide a similar device having four separate electrodes, that is a device in which gate electrodes forming ohmic contact with the outer p-type zones 2 and 3 are situated on opposite sides of the device. Other prior art devices will now be described with reference to FIGS. 3 to 6 of the accompanying drawings in which by providing the n-type outer emitter zones at opposite sides of the body with their adjacent peripheries in overlapping relationship, a single gate electrode can be provided to cause initiation of conduction in both the first and third quadrants on application of a voltage of suitable polarity to the gate electrode.

Figure 3:
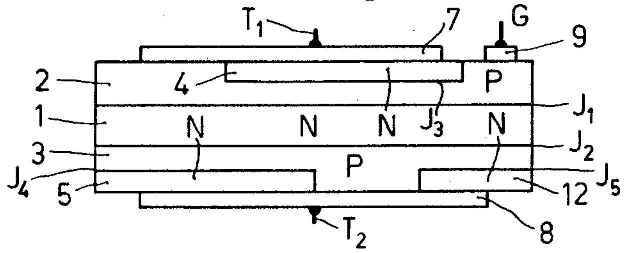
Fig.3 PRIOR ART

The device shown in FIG. 3 comprises a single, outer n-type emitter zone 4 at one side of the body forming a p-n junction $J_3$ with the p-type zone 2 and two outer, n-type emitter zones 5 and 12 at the opposite side of the body respectively forming p-n junctions $J_4$ and $J_5$ with the p-type zone 3. The adjacent peripheries of the outer n-type zones 4 and 4 are situated on opposite sides of the body so that these two zones are in overlapping relationship. Also the adjacent peripheries of n-type zones 4 and 12 are situated on opposite sides of the body so that these two zones are in overlapping relationship. This overlapping relationship is essential to the operation of the device since the turn-on of the device by means of the application of a suitable potential to the ohmic gate electrode 9 via terminal G is dependent upon the carrier conduction mechanism occurring in the areas of overlap. This device can be switched from the non-conductive state to the conductive state both in the first and third quadrants by the application of a voltage to terminal G which is positive with respect to the voltage applied at terminal $T_1$.

Figure 4:
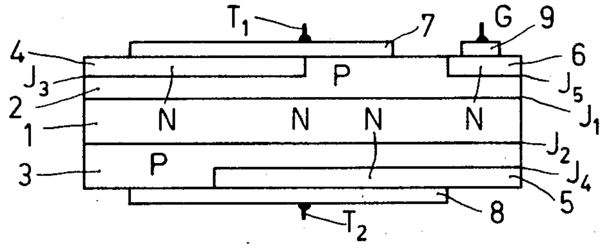
Fig.4 PRIOR ART

The device shown in FIG. 4 comprises at the one side an outer, n-type emitter zone 4 forming a p-n junction $J_3$ with the p-type zone 2 and an n-type gate zone 6 forming a p-n junction $J_5$ with the p-type zone 2. On the opposite side there is a single, outer n-type emitter zone 5 forming a p-n junction $J_4$ with the p-type zone 3. The adjacent peripheries of the outer n-type zones 4 and 5 are situated on opposite sides of the body so that these two zones are in overlapping relationship. Furthermore the n-type zone 5 is of such a size and position as to have a portion situated directly opposite the n-type gate zone 6. This overlapping and facing relationship is essential to the operation of the device since the turn-on of the device via a suitable potential applied to the gate electrode 9 in ohmic contact with the gate zone 6 is dependent upon the carrier conduction mechanism occurring in the areas of overlap. This device can be switched from the non-conductive state to the conductive state both in the first and third quadrants by the application of a voltage to terminal G which is negative with respect to the voltage applied at terminal $T_1$.

Figure 5:
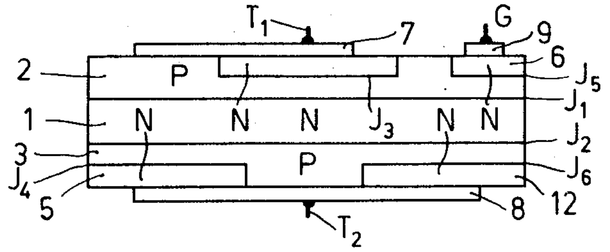
Fig.5 PRIOR ART

The device shown in FIG. 5 differs from the device shown in FIG. 4 in that at the lower side two n-type emitter zones 5 and 12 are present, the zones 5 and 12 both being in overlapping relationship with the n-type emitter zone 4 at the upper side. This device can be switched from a non-conductive state to the conductive state in the first and third quadrants with a positive or negative voltage on the gate terminal G with respect to the voltage at the terminal $T_1$.

Figure 6:
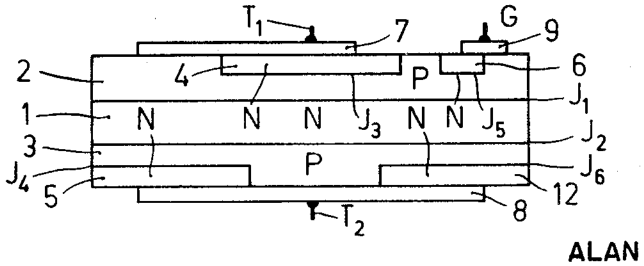
Fig.6 PRIOR ART

FIG. 6 shows another device which can be rendered conductive in both the first and third quadrants by a positive or negative voltage on the gate terminal relative to the voltage on terminal $T_1$. This device differs from the device shown in FIG. 5 in that the gate zone 6 is so dimensioned that the junction $J_5$ between the n-type gate zone 6 and the p-type zone 2 terminates wholly in the upper surface and the gate electrode 9 forms an ohmic contact to the gate zone 6 and the p-type zone 2. The carrier conduction mechanism of the device differs slightly from that occurring in the FIG. 5 device when a positive voltage is applied to the gate with respect to the terminal $T_1$.

The latter two devices described with reference to FIGS. 5 and 6 have four modes of operation as follows:-

| Mode | $T_1$ polarity | $T_2$ polarity | Gate polarity with respect to $T_1$ |
|---|---|---|---|
| I+ | − | + | + |
| I− | − | + | − |
| III+ | + | − | + |
| III− | + | − | − |

The I+ and the I− modes are in the first quadrant with the gate currents respectively positive and negative. The III+ and III− modes are in the third quadrant with the gate currents respectively positive and negative. In the devices shown in FIGS. 3 to 6 it is essential that the adjacent peripheries of the outer n-type emitter zones on opposite sides of the body are in overlapping relationship. This requirement applies most stringently in those devices which can bee operated in the III+ mode. However in providing this overlap another problem arises. The devices described may be considered as the integration of two anti-parallel thyristors which share the same n-type base, that is passage of current between the first and second main current carrying electrodes in the first quadrant is through the n-p-n-p thyristor structure and passage of current between the first and second main current carrying electrodes in the third quadrant is via the p-n-p-n thyristor structure. In operation it is necessary to commutate from one thyristor structure in the conductive condition to the other thyristor structure in the non-conductive condition. This commutation is severely limited by the stored charge in the shared n-type base zone in the region of overlap of the outer, n-type emitter zones on opposite sides of the body because if the commutating speeds *dI/dt* and *dy/dt* are too high this available charge will switch the other thyristor structure from the non-conductive to the conductive state. For this reason the commutating speeds must be kept low. Typical state-of-the-art values are 10 A/mS from 20 A at 10V/$\mu$S to 600V, these ratings generally applying at 100°C. The ratings could be improved if the periphery of the outer n-type emitter zones on opposite sides of the body were separated so that no overlap was present. However as already described it is a basic requirement for the operation of the devices that the overlap is present. Therefore a compromise has to be made in determining the amount of overlap in order to provide reasonable commutation speed capability and sensitive turn-on control in the various modes of operation. Particularly, the overlap is essential for operation of the device in the III+ mode.

According to the invention, a bilateral gate-controlled semiconductor device comprises a semiconductor body having an inner zone of one conductivity type between first and second outer zones of the opposite conductivity type extending respectively at first and second opposite sides of the body forming p-n junctions with the inner zone, the first and second outer zones respectively being in ohmic contact with first and second main current carrying electrodes at said first and second opposite sides of the body, first and second further zones of the one conductivity type forming p-n junctions with the first and second outer zones respectively and extending at said first and second opposite sides of the body respectively and extending at said first and second opposite sides of the body respectively in ohmic contact with the first and second main current carrying electrodes, a gate electrode at said first side of the body in contact with the first outer zone, the first and second further zones of the conductivity type at said first and second opposite sides of the body being so situated that, with respect to the direction of current flow between the main current carrying electrodes, the parts of their adjacent peripheries in the vicinity of the gate electrode are in overlapping relationship and the adjoining parts of their adjacent peripheries beyond the vicinity of the gate electrode are in non-overlapping relationship.

In this device, by localizing the region of overlap of the outer emitter zones situated at opposite sides of the body to the vicinity of the gate electrode, the commutation problems are minimized by having the lowest possible current density in this area of overlap. Furthermore, by providing this overlap sensitive triggering of the device is still possible, particularly in the III+ mode.

The said adjoining parts of the adjacent peripheries of the first and second further zones of the one conductivity type which are in non-overlapping relationship may be advantageously situated, with respect to said direction of current flow, in spaced relationship. In this manner the maximum advantage of increase of the commutation speed capability is obtained. However in some forms of device in accordance with the invention the said adjoining parts of the adjacent peripheries may be in non-overlapping relationship in the sense that, with respect to said direction of current flow, their spacing is substantially zero. This latter structure, which may be a requirement imposed by the manufacturing procedures involved in certain devices, may not provide such a large increase in the commutation speed capability as in the structures in which the said adjoining parts of the adjacent peripheries are in spaced relationship but nevertheless an improvement thereof will result.

In a preferred form of a device in accordance with the invention, in the vicinity of the gate electrode, the first main current carrying electrode where it contacts the first further zone of the one conductivity type is laterally spaced, with respect to the said direction of current flow, from the area of overlap of the first and second further zones of the one conductivity type. This effectively puts a high resistance in the current path from the main current carrying electrode to the region of overlap. With this structure, when the device is in the conducting state and the applied voltage polarity is such that the first further zone of the one conductivity type constitutes the outer emitter zone of one four zone thyristor structure through which the main current flow occurs between the main current carrying electrodes with said applied voltage polarity, the highest current density is in the direct shadow of the first main current carrying electrode and in this area the first and second further zones of the one conductivity type do not overlap. As the overlap is in the vicinity of the gate electrode, access of carriers characteristic of the one conductivity type from the first further zone of the one conductivity type to the area of the overlap is via the relatively high impedance part of said further zone which is not covered by the first main current carrying electrode. The current density is therefore very low in the area of overlap, so reducing to a minimum the stored charge in the inner zone of the one conductivity type in that area. This minimal stored charge soon recombines, permitting high switching speeds.

Devices in accordance with the invention may have various forms of gate electrodes in combination with gate zones according to the desired operational modes. However, preferred forms of a device in accordance with the invention are constructed such that the device can be switched from the non-conductive state to the conductive state in the first and third quadrants by voltages applied to the gate electrode which are positive or negative with respect to the voltage applied at the first main current carrying electrode. In one such preferred device a gate zone of the one conductivity type is present at the first side and forms a p-n junction with the first outer zone of the opposite conductivity type, the gate zone being spaced from the first further zone of the one conductivity type and situated opposite a portion of the second further zone of the one conductivity type at the second side of the body, the gate electrode at the first side forming a common ohmic contact to the gate zone of the one conductivity type and to the first outer zone of the opposite conductivity type, the first and second further zones of the one conductivity type being in the said overlapping relationship in the vicinity of the gate zone.

Devices having the latter preferred form may be constructed in various different ways, for example the semiconductor body may be in the form of a rectangular wafer and the outer emitter zones may be of substantially rectangular form apart from the regions in which the overlapping occurs. However in a preferred form the semiconductor body is in the form of a substantially circular disc, the gate zone being situated substantially centrally of the disc at the first side of the body. In one such device the parts of the adjacent peripheries of the first and second further zones of the one conductivity type which are in overlapping relationship in the vicinity of the substantially centrally disposed gate zone are disposed radially at one side of the gate zone, and the adjoining parts of their adjacent peripheries which are in spaced relationship are disposed extending substantially parallel to a diametrical direction.

In the last described device the substantially centrally disposed state zone may be substantially C-shaped having a re-entrant portion which faces at said one side of the gate zone the radially disposed overlapping peripheral parts of the first and second further zones of the one conductivity type.

The gate electrode may be of substantially circular outline and be substantially centrally disposed forming ohmic contact with the gate zone of the one conductivity type and the first outer zone of the opposite conductivity type, the first main current carrying electrode being of substantially annular form.

The first and second further zones of the one conductivity type where they extend at the first and second sides of the body respectively may each comprise interruptions where portions of the first and second outer zones of the opposite conductivity type respectively extend at said first and second opposite sides of the body respectively, the first and second main current carrying electrodes extending at said first and second opposite sides respectively in contact with said portions and shorting the p-n junctions between said portions of the opposite conductivity type and the first and second further zones of the one conductivity type. It will be appreciated by those skilled in the art that these p-n junction shorts will improve the non-commutating *dv/dt*. That is to say that a device in a non-conducting condition will continue in that state following the application of a high *dv/dt*. This may be hundreds of volts per microsecond and much higher than can be achieved in commutating. With the optimized overlap in accordance with the invention this can be advantageous to the commutated *dv/dt*, whereas its adoption in a prior art device would be of little value.

Figure 13:
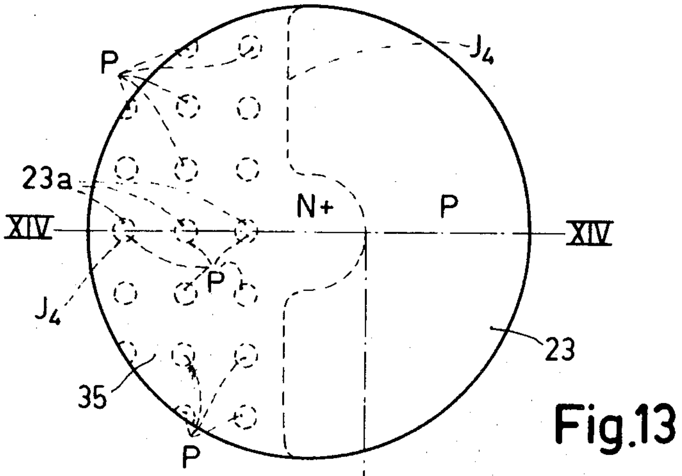
Figure 14:
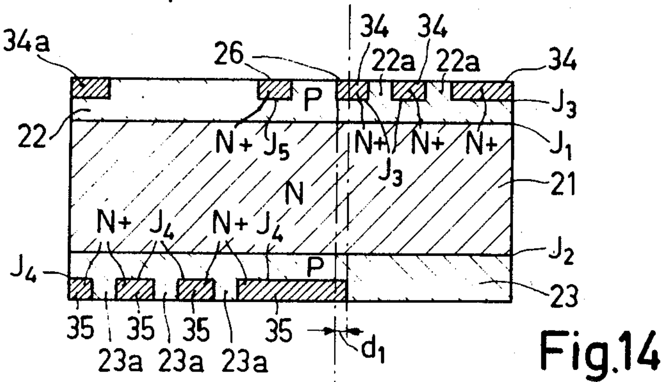
Figure 15:
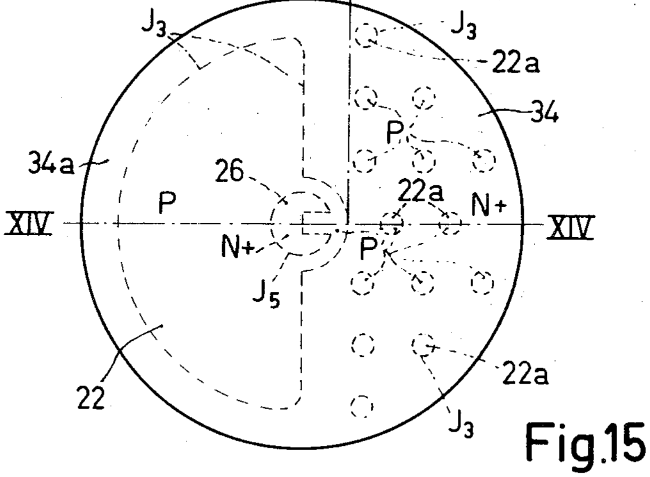
Figures 16, 17, 18:
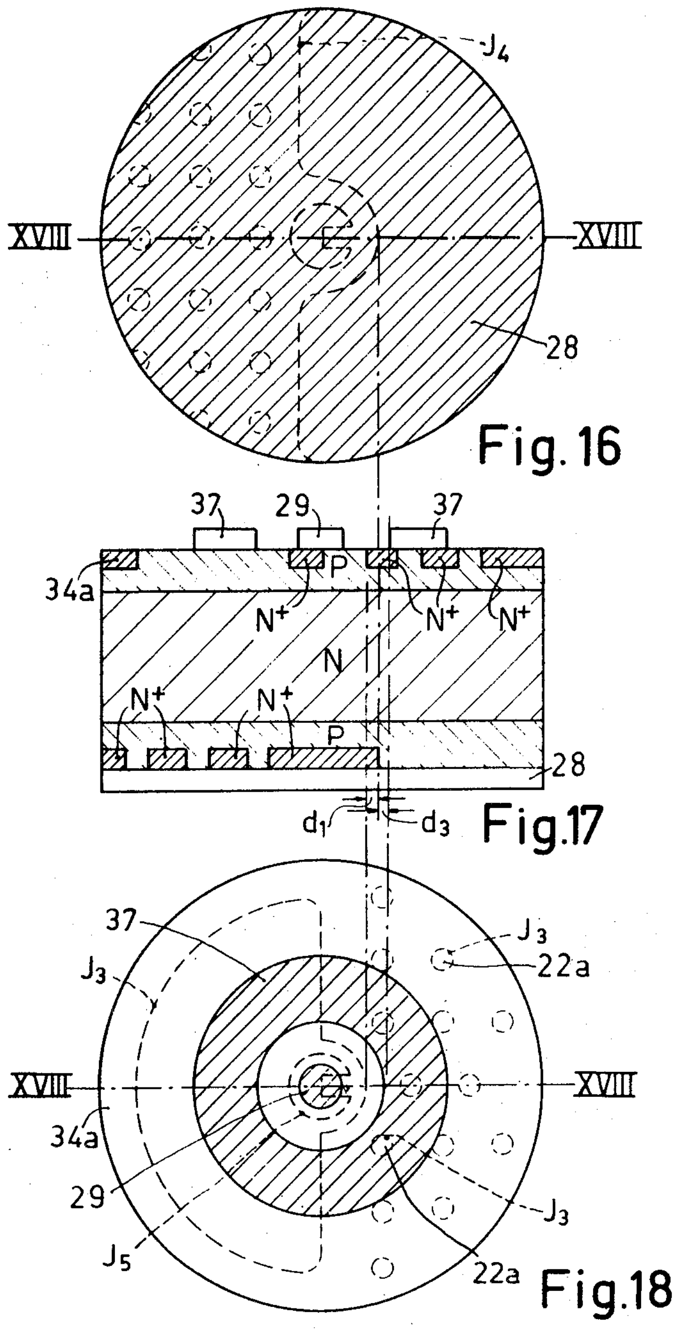
Figure 19:
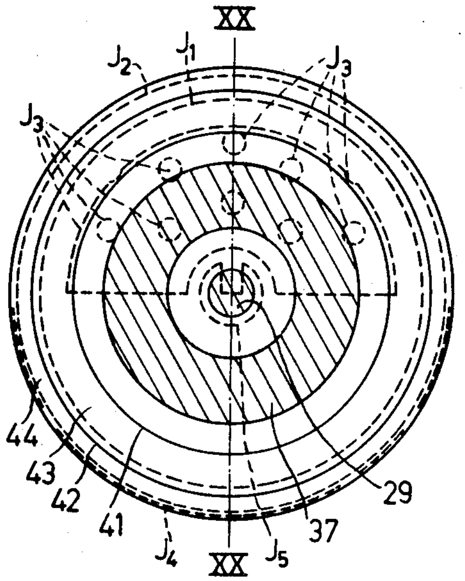
Figure 20:
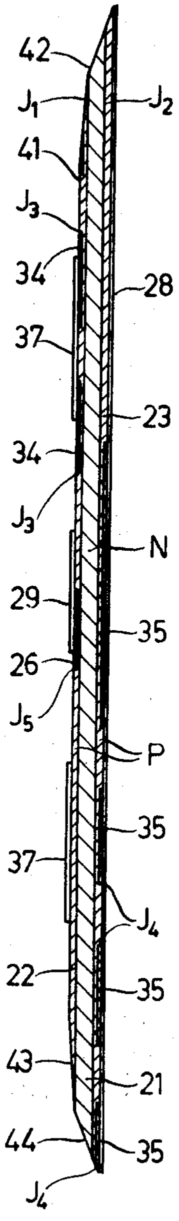

Embodiments of the invention will now be described, by way of example, with reference to FIGS. 7 to 20 of the accompanying diagrammatic drawings, of which FIGS. 7, 8 and 9 respectively are a plan of the underside, vertical section, and plan of the upper side of the semiconductor body of a first embodiment of a bilateral gate-controlled semiconductor device in accordance with the invention prior to application of electrodes thereon, and FIGS. 10, 11 and 12 respectively are a plan of the underside, vertical section, and plan of the upper side of the same semiconductor body after application of electrodes thereon;

FIG. 13, 14 and 15 respectively are a plan of the underside, vertical section, and plan of the upper side of the semiconductor body of a second embodiment of a bilateral gate-controlled semiconductor device in accordance with the invention prior to application of electrodes thereon; and FIGS. 16, 17 and 18 respectively are a plan of the underside, vertical section, and plan of the upper side of the same semiconductor body after application of electrodes thereon, and FIGS. 19 and 20 are a plan view and section corresponding respectively to FIGS. 18 and 17 after subjecting the body shown in FIGS. 16 to 18 to a double bevelling process.

Figures 7, 8, 9:
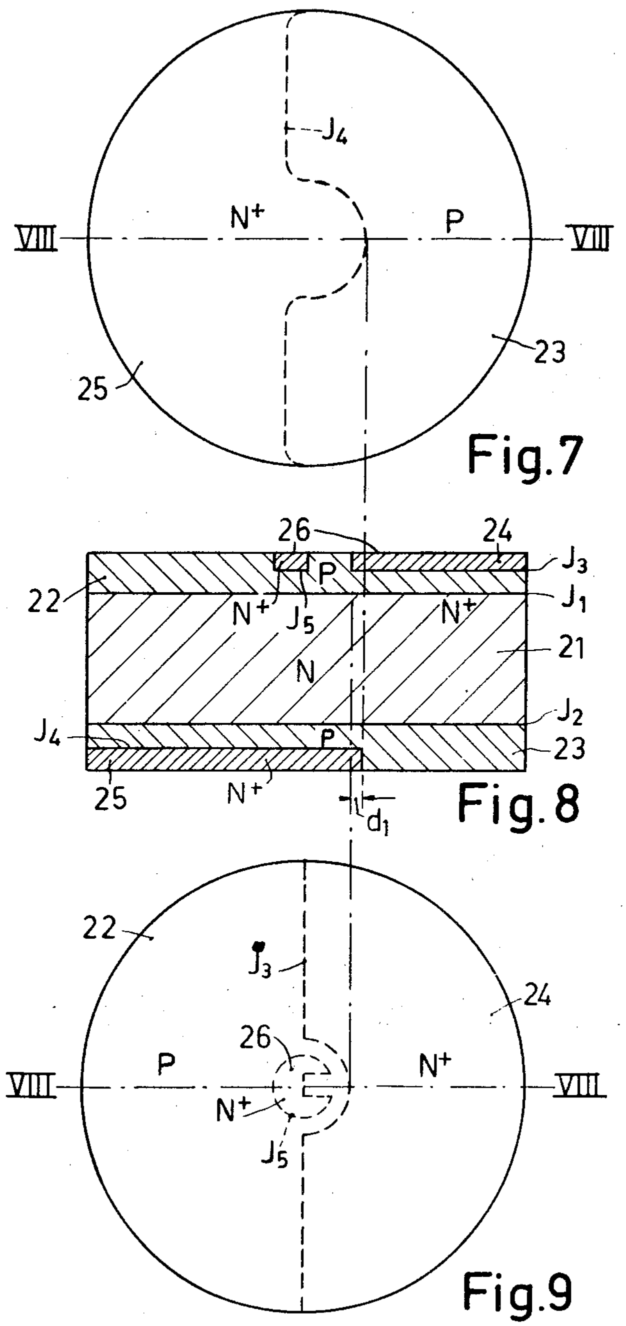
Figures 10, 11, 12:
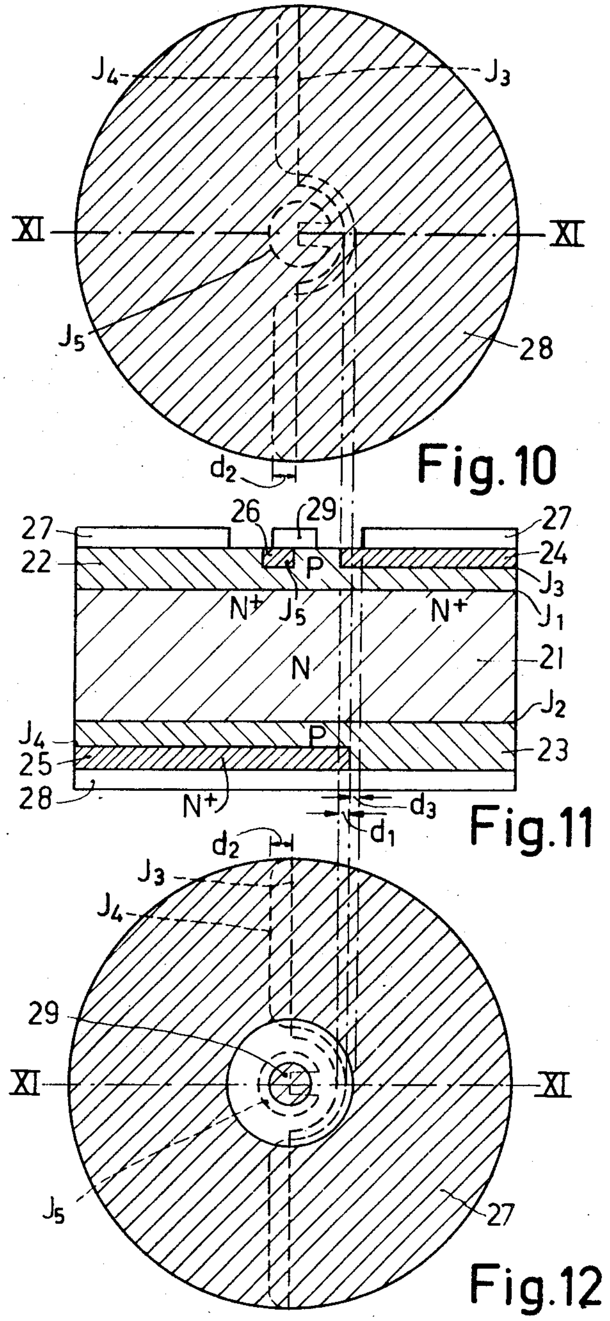

Referring first to the device shown in FIGS. 7 to 12 inclusive, the section of FIG. 8 is taken on the lines VIII—VIII of FIGS. 7 and 9 and the section of FIG. 11 is taken on the lines XI—XI of FIGS. 10 and 12. The device comprises a circular, disc-shaped semiconductor body of approximately 10 mm. diameter and 0.25 mm. thickness having an inner n-type zone 21 and diffused, outer p-type zones 22 and 23 situated at opposite sides of the body and forming p-n junction $J_1$ and $J_2$ respectively with the inner zone 21. $N^+$-type diffused zones 24 and 25 also extend at the opposite sides of the body and respectively form p-n junctions $J_3$ and $J_4$ with the outer, p-type zones 22 and 23. A diffused $n^+$-type gate zone 26 also extends centrally disposed at the upper side of the body and forms a p-n junction $J_5$ with the outer, p-type zone 22.

The junctions $J_1$ and $J_2$ extend completely across the semiconductor wafer and terminate in side surfaces thereof. These side surfaces are in fact bevelled so that the junction planes are inclined to the side surface planes at the emergence of the junctions in the side surfaces, but not shown as such in the drawings for the sake of simplicity. The junctions $J_3$ and $J_4$ partially terminate in the opposite main surfaces of the wafer and partially terminate in the side surfaces. Their termination in the opposite main surfaces is shown in FIGS. 7 and 9 by the broken lines referenced $J_4$ and $J_3$ respectively. The junction $J_5$ terminates wholly at the upper main surface and this is indicated by the broken line referenced $J_5$ in FIG. 9.

Referring now to FIGS. 10, 11 and 12, these Figures correspond substantially to FIGS. 7, 8 and 9 respectively with the main difference that they additionally show the electrode structures present on the opposite major surfaces of the semiconductor body. Furthermore FIGS. 10 and 12 both show in broken lines the positions of the termination of junction $J_4$ at the lower surface and the termination of junctions $J_3$ and $J_5$ at the upper surface. The electrode structure consists of a first main current carrying electrode 27 of annular configuration on the upper surface and forming a common ohmic contact to the outer, p-type zone 22 and the upper $n^+$-type zone 24, a second main current carrying electrode 28 of circular configuration on the lower surface and forming a common ohmic contact to the outer, p-type zone 23 and the lower $n^+$-type zone 25, and a centrally disposed circular gate electrode 29 forming a common contact to the $n^+$-type gate zone 26 and the outer, p-type zone 22.

In this device on application of an alternating supply between the main electrodes 27 and 28 current flow can occur when the main electrode 27 is negative with respect to main electrode 28 via the n-p-n-p thyristor structure formed by zones 24, 22, 21, 23 and when main electrode 27 is positive with respect to main electrode 28 via the p-n-p-n thyristor structure formed by zones 22, 21, 23, 25.

From FIGS. 7, 8 and 9 it is seen that the $n^+$-type zones 24 and 25 are situated at opposite sides of the body such that their adjacent peripheries, the limits of which are indicated by the broken lines $J_3$ and $J_4$ respectively in the plan Figures, in the vicinity of the gate electrode 29 and associated gate zone 26 are in overlapping relationship with respect to the direction of current flow between the electrodes 27 and 28 and at the adjoining parts of their adjacent peripheries are in spaced relationship. The overlapping portions of the adjacent peripheries of the $n^+$-type zones 24 and 25 are radially situated at one side of the centrally disposed gate zone 26. The amount of this overlap is indicated by dimension $d_1$ in FIGS. 8 and 11 and is approximately 0.25 mm. in these sections. The adjoining parts of the adjacent peripheries of the $n^+$-type zones 24 and 25 extend substantially parallel to a diametrical direction and are spaced, this spacing being indicated by dimension $d_2$ is FIGS. 10 and 12 and having a value of approximately 0.25 mm.

The diffused $n^+$-type gate zone 26 in substantially C-shaped and comprises a re-entrant portion where the p-type zone 22 extends to the surface and is contacted by the centrally disposed gate electrode 29.

With the said situation of the $n^+$-type zones 24 and 25 at the opposite sides of the body in which the overlap is confined to the vicinity of the gate electrode 29 and associated gate zone 26, optimum commutation speed capability consistent with sensitive turn-on facilities is achieved. Operation of the device in the III+ mode will now be considered in specific detail. In this mode electrode 27 is positive with respect to electrode 28 and electrode 29 is positive with respect to both electrodes 27 and 28. With this positive bias on the gate electrode 29 the $n^+$-type zone 24 injects electrons into the p-type zone 22 towards the ohmic gate contact. Some of these injected electrons drift into the inner n-type zone 21 thus lowering its charge. To compensate this $J_1$ becomes more forward biased and more holes are injected from the p-type zone 22 into the n-type zone 21 across $J_1$. These holes are collected by junction $J_2$ and travel across the p-type zone 23 along the length of the overlap $d_1$ and finally reach the electrode 28. As the current is increased the voltage drop in the overlap region in the p-type zone 23 increases until eventually this voltage drop has the effect of forward biasing the part of junction $J_4$ in the overlap region at a point immediately under the overlapping part of the $n^+$-type zone 24. This switches on the p-n-p-n thyristor, constituted by zones 22, 21, 23 25, to a point of the electrode 27 in the vicinity of the gate zone 26. Current thereafter rapidly spreads to the whole of the main electrode 27, the whole of junction $J_4$ acting as an emitter. From the above description of the operation in the III+ mode it is clear that the overlap of the zones 24 and 25 only in the vicinity of the gate provides for sensitive turn-on in this mode. Furthermore the commutation speed restriction which occurs in prior art devices is minimized because of the spatial separation of the adjoining parts of the adjacent peripheries of the zones 24 and 25 and the low current density that occurs in the area of the overlap of the zones 24 and 25.

Another important feature of the device is the configuration of the electrode 27 with respect to the n-type zone 25. The electrode 27 has an internal diameter such that in the region of the overlap of the zones 24 and 25, the part of the electrode 27 in contact with the zone 24 is laterally spaced from the edge of the underlying part of the lower n-type zone 25, and hence the overlap region, by a distance referenced $d_3$ in FIG. 11 which in this embodiment has a value of 0.25 mm. This effectively puts a high series resistance, of approximately 1 ohm., in the current path in the zone 24 from the electrode 27 to the overlap region. This resistance is in series with the forward resistance in the overlap region of the device and is at least ten times higher than it. To a first approximation this results in a reduction of current density in the area of overlap by a factor of 10 or more.

Referring now to FIGS. 13 to 20 inclusive, the section of FIG. 14 is taken on the lines XIV—XIV of FIGS. 13 and 15 and the section of FIG. 17 is taken on the lines XVII—XVII of FIGS. 16 and 18.

The structure shown in FIGS. 13, 14 and 15 is at a stage of manufacture after forming the various diffused regions in the body. The structure shown in FIGS. 16, 17 and 18 is at a stage of manufacture after applying electrodes and prior to bevelling of the side surface of the semiconductor body. The structure shown in FIGS. 19 and 20 is at a stage of manufacture after bevelling of the side surface of the body.

This device is a modification of the device shown in FIGS. 7 to 12, corresponding parts being indicated with the same reference numerals. The main differences are as follows. The outer $n^+$-type zone at the upper side, now referenced 34, comprises interruptions where portions 22*a* of the upper p-type zone extend to the surface at the upper side. The outer $n^+$-type zone at the lower side, now referenced 35, comprises interruptions where portions 23*a* of the lower p-type zone 23 extend to the surface at the lower side. At said lower side the electrode 28 contacts all the portions 23*a* and shorts the p-n junction parts at the surface between these p-type region parts and the lower $n^+$-type zone 35. At the upper side the main current carrying electrode is an annular electrode 37 (FIGS. 18 and 19) and forms contact with only some of the p-type parts 22*a* and thus shorts some of the p-n junction parts at the surface between the p-type regions parts 22*a* and the upper n-type zone 34. The gate zone 26 and gate electrode 29 (FIGS. 18 and 19) have the same configuration as in the previous embodiment.

In the plan view of FIG. 19, the bevelled side surface is shown. It is seen that this side surface has two main portions inclined at different angles to the plane of the semiconductor disc and obtained by a double bevelling operation. Solid lines 41 and 42 indicate the diametrical positions at which the side surface inclination changes. In the plan view of FIG. 19 and in the section of FIG. 20 the bevelled side surface is shown. In FIG. 19 solid lines 41 and 42 indicate the diametrical positions at which the side surface inclination to the plane of the main surfaces of the semiconductor disc changes. FIG. 20 shows the body having a side surface having two main portions 43 and 44 obtained by a double bevelling operation. The emergence of junction $J_1$ is in the portion 43 which is inclined at one angle to the main surfaces, and hence the junction plane of $J_1$, and the emergence of junction $J_2$ is in the portion 44 which is inclined at another angle to the main surfaces, and hence the junction plane of $J_2$. FIG. 19 also shows the emergence in the side surface of junction $J_4$, the emergence in the top and side surface portion 43 of junction $J_3$, and the emergence in the top surface of junction $J_5$.

The basic steps involved in the manufacture of the device shown in FIGS. 13 to 20 will now be described. In each case the starting material is a disc of n-type silicon of 28 mm. diameter and 0.25 mm. to 0.3 mm. thickness. The slice is prepared to be optically flat by lapping and etching prior to the first diffusion process. Diffusion of acceptor impurity is effected into the opposite major surfaces of the slice to form the outer p-type regions 22, 23 and the junctions $J_1$ and $J_2$ each of which is situated at a depth of approximately 50 microns from the adjacent surface. The acceptor impurity may be, for example, gallium or boron. If gallium is used, then additionally boron may be diffused to give a high surface concentration which provides for good low resistance ohmic contacting in a subsequent stage of manufacture. The 28 mm. diameter slice is then divided into four smaller discs, each of 10 mm. diameter by an ultrasonic cutting process.

The following description will be in terms of the subsequent processing of one such disc of 10 mm. diameter. By a process commonly employed in the semiconductor art, the disc is provided with an oxide layer on all surfaces. Masking layers are applied on the oxide layer on opposite major sides of the disc, these layers having the patterns desired to obtain, by subsequent diffusion of phosphorus, the outer $n^+$-type emitter zones 34 and 35 and the $n^+$-type gate zone 26. The masking layers may be formed using a photoresist which is defined by a photoprocessing method using photomasks. However as an alternative the process of wax spraying through metal masks may advantageously be employed. In the latter method, the areas of the oxide which are to be protected by the mask are coated with wax. Thereafter the uncovered oxide layer is etched, for example with hydrofluoric acid to expose the underlying silicon surface parts. The wax masking or remaining photoresist, as the case may be, is then removed. A phosphorus diffusion step is then carried out by techniques commonly used in the semiconductor art to form the outer $n^+$-type emitter zones 34 and 35 and the n-type gate zone 26. After this phosphorus diffusion the disc has the form shown in FIGS. 13, 14 and 15, the junction depths of the $n^+$-type zones 34, 35, 26 from the adjacent surfaces being approximately 20 microns in each case and the phosphorus surface concentration bring approximately $10^{21}$ atoms/cm.$^{-3}$ For the sake of clarity the residual oxide layer parts on the opposite surfaces are not shown in the section of FIG. 14. The electrodes 37, 28 and 29 as shown in FIGS. 16, 17 and 18 are then applied. At the upper surface this is effected using a further oxide mask definition step, for example using the wax spraying and etching technique previously described. There is formed an annular aperture in the oxide layer corresponding to the subsequent location of the electrode 37 and a centrally disposed circular aperture corresponding to the subsequent location of the gate electrode 29. At the lower surface the remaining oxide layer parts are removed. Application of the electrodes 37, 28 and 29 on the exposed silicon surface portions is then effected by the electroless deposition of a nickel layer of 2 to 3 microns thickness followed by the electroless deposition thereon of a thin gold layer. The device then has the configuration shown in FIGS. 16, 17 and 18. It is noted that at this stage of the processing the $n^+$-type region 34 has a rim portion 34a extending at the upper surface on the left hand side in the Figures. This $n^+$-type rim portion 34a is removed by a subsequently carried out bevelling process in which the side surface of the disc is bevelled in order that the junctions $J_1$ and $J_2$ at their emergence in the side surface are inclined at various predetermined angles to the planes of the side surface portions at said emergence. In the present case a two-stage bevelling process is carried out, as commonly employed in the semiconductor art, the junctions $J_1$ and $J_2$ being inclined at their emergence to the respective side surface portions at different angles. It is also noted that in FIG. 18 some of the outer situated portions 22a of the outer p-type region 22 are not contracted by the electrode 37 and the parts of junction $J_3$ associated therewith are not shorted by the electrode 37. Some of these outer portions 22a do not appear in the structure produced after bevelling and their inclusion at the stage before bevelling, that is their formation as a result of the geometry of the masking used for the phosphorus diffusion, is due to mask design and handling considerations. Similarly the provision of the $n^+$-type rim 34a and its subsequent removal when bevelling is also due to mask design and handling considerations. Similarly the provision of the $n^+$ -type rim 34a and its subsequent removal when bevelling is also due to mask design considerations and the handling of the device during the various processing stages. However it will be appreciated that the latter described features of the method are not related to the provision of the device structure in accordance with the invention.

After bevelling the semiconductor body is mounted on a suitable header, for example by soft soldering with a lead/tin disc between electrode 28 and the header or by hard soldering with a gold/germanium disc between the electrode 28 and the header. Thereafter leads are secured to the electrodes 29 and 37 and the assembly encapsulated in a manner commonly employed in the semiconductor art.

It will be appreciated that many modifications are possible within the scope of the invention as defined in the appended claims. For example, devices having different forms of operation in respect of the polarity of the voltage applied on the gate electrode for triggering the device in the first and third quadrants are possible, the gate electrode structure being appropriately determined but the device still having the optimized overlap structure of the outer emitter zones in accordance with the invention. Thus devices may be constructed such as is shown in FIG. 3, in which the gate electrode is only in ohmic contact with the outer zone of the opposite conductivity type or, such as are shown in FIGS. 4 and 5, in which the gate electrode is only in ohmic contact with a gate zone of the one conductivity type provided in the outer zone of the opposite conductivity type. In this connection the term 'a gate electrode at said first side of the body in contact with the first outer zone' is to be understood to include the case when the gate electrode contacts said zone via a gate zone of the one conductivity type provided in the first outer zone of the opposite conductivity type and which forms a p-n junction with said first outer zone.

Furthermore, in the two embodiments described with reference to FIGS. 7 to 12 and FIGS. 13 to 20 of the accompanying drawings, the parts, beyond the vicinity of the gate electrode, of the adjacent peripheries of the $n^+$--type emitter zones — adjoining those parts thereof which are in overlapping relationship in the vicinity of the gate electrode are in spaced relationship, that is they are spaced by distance, for example $d_2$ in FIGS. 10 and 12. However, within the scope of the invention as defined in the appended claims is the structure where these parts are in non-overlapping relationship in the sense that they have a substantially zero spacing.

What we claim is:

1. A bilateral gate-controlled semiconductor device having a semiconductor body comprising an inner zone of one conductivity type between first and second outer zones of the opposite conductivity type, said first and second outer zones extending at first and second opposite sides of said body respectively and forming p-n junctions with said inner zone, first and second main current carrying electrodes in ohmic contact with said first and said second outer zones respectively, first and second further zones of the one conductivity type, said first and said second further zones forming p-n junctions with said first and said second outer zones respectively and extending at said first and said opposite sides of said body respectively in ohmic contact with said first and said second main current carrying electrodes, a gate zone of the one conductivity type at said first side of the body, said gate zone forming a p-n junction with said first outer zone, said gate zone being spaced from said first further zone and being situated opposite a portion of said second further zone, and a single gate electrode at said first side of the body in ohmic contact with said gate zone and said first outer zone, said first and said second further zones being situated between said first and said second main current carrying electrodes with respect to current flow direction so that parts of their adjacent peripheries proximate to said gate electrode are in overlapping relationship and other parts off their adjacent peripheries distal to said gate electrode are in spaced relationship.

2. A bilateral gate-controlled semiconductor device as claimed in claim 1, wherein the ohmic contact between the first main current carrying electrode and the first further zone is laterally spaced from the overlapping of adjacent peripheries of the first and second further zones with respect to the direction of current flow.

3. A bilateral gate-controlled semiconductor device as claimed in claim 1, wherein the semiconductor body is in the form of a substantially circular disc, the gate zone being situated substantially centrally of the disc at the first side of the body.

4. A bilateral gate-controlled semiconductor device as claimed in claim 3, wherein the parts of the adjacent peripheries of the first and second further zones which are in overlapping relationship in the proximity of the substantially centrally disposed gate zone are disposed radially at one side of the gate zone, and the adjoining parts of their adjacent peripheries which are in spaced relationship are disposed extending substantially parallel to a diametrical direction.

5. A bilateral gate-controlled semiconductor device as claimed in claim 4, wherein the substantially centrally disposed gate zone is substantially C-shaped having a re-entrant portion which faces at said one side of the gate zone the radially disposed overlapping peripheral parts of the first and second further zones.

6. A bilateral gate-controlled semiconductor device as claimed in claim 4, wherein the gate electrode is of substantially circular outline and is substantially centrally disposed forming ohmic contact with the gate zone and the first outer zone, and the first main current carrying electrode is of substantially annular form.

7. A bilateral gate-controlled semiconductor device as claimed in claim 4, wherein the first and second further zones where they extend at the first and second sides of the body both comprise interruptions where portions of the first and second outer zones respectively extend at said first and second opposite sides of the body, the first and second main current carrying electrodes extending at said first and second opposite sides respectively in contact with said portions and shorting the p-n junctions between said portions of the opposite conductivity type and the first and second further zones.

* * * * *

PO-1050
(5/69)

UNITED STATES PATENT OFFICE
CERTIFICATE OF CORRECTION

Patent No. 3,696,273 Dated October 3, 1972

Inventor(s) ALAN FOSTER

It is certified that error appears in the above-identified patent and that said Letters Patent are hereby corrected as shown below:

Column 4, line 41, change "4 and 4" to --4 and 5--.

Column 13, lines 26-28, delete the following "Similarly the provision...considerations.".

Signed and sealed this 8th day of May 1973.

(SEAL)
Attest:

EDWARD M. FLETCHER, JR.
Attesting Officer

ROBERT GOTTSCHALK
Commisioner of Patents